Patented May 26, 1936

2,042,313

UNITED STATES PATENT OFFICE 2,042,313

PHENOLIC CONDENSATION PRODUCTS AND METHOD OF MAKING THE SAME

Joseph Hidy James, Pittsburgh, Pa., assignor to Clarence P. Byrnes, trustee, Sewickley, Pa.

No Drawing. Application September 25, 1924, Serial No. 739,924

17 Claims. (Cl. 260—4)

In the previous work done in this field, there have been used for the aldehydic part of the reaction, usually formaldehyde or one of its derivatives, such as hexamethylenetetramine, and in some cases acetaldehyde.

The invention herein described consists in the production of synthetic resins of high industrial value from very cheap aldehydic and hydroxylated materials made from the hydrocarbons of petroleum, low temperature coal distillation, shale oil, etc., by my vapor-phase catalytic oxidation process, such as set forth in detail in my copending applications, Serial No. 272,567, filed January 22, 1919, Serial No. 281,124, filed March 7, 1919, now Patent 1,697,653 and Reissue 18,522, Serial No. 335,939, filed November 5, 1919, and Serial No. 435,355, filed January 6, 1921, etc. In such a process a vaporized hydrocarbon is mixed with the air in regulated proportions and the heated mixture is passed over a catalytic layer containing preferably the oxides or compound of vanadium or molybdenum or other mixtures of similar general characteristics. The temperature is usually maintained between 170° and 500°. By such processes, I make from the foregoing hydrocarbons a liquid mixture of aliphatic aldehydes, aldehyde alcohols, aldehyde acids and hydroxylated aldehyde acids, each of several different molecular weights. I have found that these oxygenated bodies will, under certain conditions, react readily with phenol or phenols in which the hydroxyl group is substituted in the ring part of the benzene nucleus or compound or other aromatic alcohols of the phenolic type, to form synthetic resins of great practical value and very low cost of manufacture. Since phenol is a rather expensive compound, I prefer as a rule to make these condensation products by using the commercial mixture of cresols, known in the market as "95—97" cresylic acid. In the experiments later described, this latter compound was used throughout.

There are several methods of carrying out this reaction, for example. I may act upon the material by heat or by the action of mineral acids, such as hydrochloric acid, together with heat; or I may use for this step an excess of caustic soda, or its equivalent, accompanied by heating. I may take the separated partly resinified acids or polymerized bodies (the production of which I have described in other copending applications, such as Serial No. 281,197, filed March 7, 1919, Serial No. 335,940, filed November 5, 1919, and Serial No. 520,715, filed December 7, 1921 now Patent 1,894,352) and cause their condensation with phenol or any cresolic mixture by simple heating, usually taking equal weights of the "oxidation" acids and the cresolic mixture. I find that where a catalyst is used that the time may be considerably shortened. The catalyzers may in this case be substances of a basic character, such as aniline, toluidine, the xylidines or mixtures of these, the naphthylamines, etc. I may also catalyze the reaction by first saturating the mixture containing both constituents with ammonia gas before the heating is begun. I may use also for catalyzing this condensation reaction, mineral acids such as sulphuric or hydrochloric, the latter preferably being used in the form of the dry gas bubbled into the liquid mixture. Other basic substances than the group mentioned above may be used for condensation catalysts, such as sodium carbonate, caustic soda, the corresponding potassium compounds and ammonium hydroxide and carbonate.

Where these mixtures of different molecular weights are used for combination with the phenolic or cresolic bodies, the heating may be carried out in vessels which may be kept at atmospheric pressure, but provided with covers to retain any vaporized phenols or cresols that may tend to escape by vaporization.

It should be remembered that it is advisable to maintain such conditions in the apparatus that these reacting bodies are retained, while the water that is formed may escape. Ordinarily, a simple loosely covered kettle will serve for these conditions. Of course, for special cases and particularly for speeding up the reaction, I may heat the above mixture in autoclaves so arranged that the water (steam) may be blown off and any cresolic bodies caught in a suitable scrubbing or condensing system, to be used either in the same or another batch.

I prefer to heat the mixture by slowly raising the temperature through comparatively long periods of time, since better control of the product is thereby obtained, and usually products of better properties result.

The second method of making these condensation products consists in heating the phenol or cresols with either the original total oxidation mixture of my main process, such as described in application Serial No. 435,355, or the particular fraction thereof, obtained by distillation or otherwise, that will give the properties desired. When this heating is carried out on the total oxidation product or on one of the lighter fractions thereof, provision should be made for the return of the lighter more volatile portions of the oxidation product to the reaction vessel in the earlier stages of the heating. And here finally, the nonreacting materials are distilled off, and the resulting resin finished by "maturing" it slowly by longer heating to temperatures that gradually increase. Of course, pressure may be used in the early stages of heating here, in order to hasten the process.

In this second method, good results are obtained by using the heaviest fraction of the oxidation mixture. In my distillation of a given oxidation mixture, I usually cut off as the heaviest fraction the part boiling above 300° C. Of course, I may even distill this into separate fractions, or may simply take the total residue from 300° C. without any further distillation. Whatever heavy fraction is taken, the procedure may follow closely that outlined above for the resin acid-phenol or resin acid-cresol reaction. This is because the oxidation part of my reaction mixture is very heavy, and all I need to watch is cresol or phenol losses. Here again, pressure may be used, with suitable means for blowing off the reaction steam and for recovery of the escaping cresolic or phenol bodies during the "blow off". In order to obtain certain desirable characteristics, particularly hardness and toughness, I may vary the above procedure by reacting on the total oil oxidation product with the cresol in the presence of a catalyst, usually taking precautions, by either refluxing or heating under pressure, to retain the volatile aldehyde bodies until they have reacted, finally distilling over the surplus oil and water, as will be described in the examples below.

In the "maturing" referred to above, we are able by slow heating to finish off the best resin possible from a given oxidation product. These resins combine the properties of hardness and toughness, resembling shellac more closely, I believe, than any synthetic product yet prepared.

The melting point and solubility of the resin is governed by the oxidation product used in the batch, as well as by the cresol or phenol used, and also by the temperature and time of heating.

The following experiments will serve to illustrate the application of my process in the production of these new condensation resins.

*Resin acid method*

In this method, I start with a resin acid mixture, made from the acids obtained from petroleum and similar hydrocarbons by my vapor-phase catalytic process. By the application of this phenol reaction, I am able to make a new resin of better properties. Thus, although a resin is used as one of the starting materials, a far better resin results by the reaction of this aldehyde resin acid with phenol or cresol.

The resin acid mixture used was made from the acids from Pennsylvania kerosene. This resin was light brown in color, melted at 115° C., and was soluble in alcohol and in benzol.

*First charge*

| | |
|---|---|
| Resin acids | 10 grams |
| Cresylic acid | 10 cc. |
| Aniline | .5 cc. |

This mixture was placed in a porcelain casserole and covered with a watch glass only. After heating on a water bath (temperature of charge 85°–90° C.) for thirty hours, the mixture, which was a thin liquid at the beginning of the process, became stiff. The resulting resin was almost black, but had a much harder surface than the original oxidation resin, and was a much tougher product. Only 11 grams of the resin was obtained, but no provision was made here for recovering the excess cresol and aniline that were lost during the heating. The new resin was gelatinized by a small amount of alcohol, but thrown out by a larger alcohol addition. It was completely soluble in benzol. The melting point of the new resin thus formed was 92° C.

*Second charge*

| | |
|---|---|
| Resin acids | 10 grams |
| Cresylic acid | 2.25 cc. |
| Aniline | .25 cc. |

This mixture was heated as before on a water bath for twenty-one hours. 9.3 grams of a resin was obtained. It was almost black, with a much harder surface than the original resin and had a tough body. Its behavior with alcohol and benzol was the same as the above, but the melting point was 69° C. It is evident, since this resin more nearly resembles the original oxidation resin in many of its physical characteristics, that the foregoing represents closely the correct conditions as to charge and time of heating.

*Total oil method*

Here the total liquid oxidation product mixture was taken to provide the aldehydic part of the cresol-aldehyde mixture. The sample was made in the usual manner by the vapor-phase catalytic oxidation of the non-saponifiable portion of "once run" Pennsylvania kerosene.

*First charge*

| | cc. |
|---|---|
| Re-run oxidized kerosene | 200 |
| Cresylic acid | 40 |
| Aniline | 2 |

The mixture was refluxed for six hours on a wax bath maintained at a temperature of 100° C.

The flask was then connected to an ordinary condenser and a distillation made to remove the oil and cresylic acid that had not reacted. The mass remaining in the still was washed out with benzol and the benzol evaporated slowly. The resin was then "matured" by being heated for fifty-five hours on the water bath (temperature 85°–90° C.) A dark resin resulted which was 90% as hard as shellac, had a tough body and melted at 78° C. This resin was completely soluble in benzol and but slightly soluble in alcohol. A yield of 25.2 grams of resin from the above charge was obtained, the excess oil and cresylic acid distilling over in the second step.

It may be noted here that when the formation of these resins has started and the surplus material has been removed by distillation, the solution of the partially formed resin in benzol hastens the reaction in the direction of the formation of a smooth hard product.

*Second charge*

| | cc. |
|---|---|
| Re-run oxidized kerosene | 200 |
| Cresylic acid | 80 |
| Aniline | 2 |

The initial heating was carried out exactly as in the first charge of this series and the surplus oil and cresol distilled over. The treatment was then the same as given above, except that the water bath maturing was carried out for forty-one hours and this was followed by a hot plate (temperature 151° C.) maturing for twenty-one hours longer. The weight of resin was approximately 31 grams. The surface of the resin smooth and very hard, almost the same as shellac. The body of the resin was almost black and very tough. The resin was easily soluble in benzol and but slightly soluble in alcohol. The resin melted at 75° C.

I have referred to the fact that the condensation of these aldehydic bodies with substances of the phenol group can be catalyzed by dry hydrochloric acid. I have found that if such charges as the three just mentioned above be treated cold with dry hydrochloric acid gas (bubbled through) and then heated on the water bath for six to twelve hours before distilling off the surplus materials, the time of maturing to get resins like those just noted in the foregoing is very much shortened. In fact, it takes but about one-fourth as much maturing time, showing that the dry hydrochloric acid gas is a much more efficient catalyst than the aniline above.

Other catalysts may be used and many changes may be made in the process, as well as in the partial oxidation material and its treatment prior to the process, without departing from my invention.

I claim:

1. In the manufacture of phenolic condensation products, the step consisting of reacting with a phenolic body a liquid mixture of synthetically-formed hydrocarbon derivatives formed by the vapor or gaseous phase partial oxidation of hydrocarbons which are mainly aliphatic and containing bodies of different molecular weights having aldehyde properties.

2. In the manufacture of phenolic condensation products, the step consisting of reacting with a phenolic body in the presence of a catalyst a liquid mixture of synthetically-formed hydrocarbon derivatives formed by the vapor or gaseous phase partial oxidation of hydrocarbons which are mainly aliphatic and containing bodies of different molecular weights having aldehyde properties.

3. In the manufacture of phenolic condensation products, the step consisting of reacting with a phenolic body a fractionated portion of a mixture of synthetically-formed hydrocarbon derivatives formed by the vapor or gaseous phase partial oxidation of hydrocarbons which are mainly aliphatic and containing bodies of different molecular weights having aldehyde properties.

4. In the manufacture of phenolic condensation products, the step consisting of reacting with a phenolic body a mixture of oxidized hydrocarbon derivatives mainly of the aliphatic type resulting from a vapor or gaseous phase reaction between carbon hydrogen and oxygen containing materials, said product containing bodies of different molecular weights having aldehyde properties.

5. In the manufacture of phenolic condensation products, the step consisting of treating with a phenolic body a fraction of a liquid mixture of oxidized hydrocarbon derivatives mainly of the aliphatic type containing bodies having aldehyde properties formed by vapor or gaseous phase reaction between carbon, hydrogen and oxygen containing materials.

6. As a new article of manufacture, the syntheic resin formed by reaction between a phenolic body and a mixture of hydrocarbon derivatives mainly of the aliphatic type and including bodies of different molecular weights having aldehyde properties formed by the vapor or gaseous phase partial oxidation of hydrocarbons mainly of the aliphatic type.

7. As a new article of manufacture, the synthetic resin formed by the reaction between a phenolic body and an oxidized hydrocarbon mixture formed by the vapor or gaseous phase catalytic reaction of carbon-hydrogen-oxygen containing gases, said derivatives containing aldehyde bodies of different molecular weights.

8. As a new article of manufacture, the synthetic resin formed by the reaction between phenolic bodies and a mixture of resin acids derived from oxidized hydrocarbon derivatives formed by vapor or gaseous phase catalytic reaction of carbon-hydrogen-oxygen containing gases, said acids being of different molecular weights.

9. As a new article of manufacture, the synthetic resin formed by the reaction between phenolic bodies and a mixture of partly resinified oxidized hydrocarbon derivatives formed by vapor or gaseous phase catalytic reaction of carbon-hydrogen-oxygen containing gases, and containing bodies of different molecular weights.

10. The step consisting of treating with a phenolic body a mixture of oxidized hydrocarbon derivatives resulting from a vapor phase reaction between carbon hydrogen and oxygen containing materials, said product containing aldehyde bodies of different molecular weights.

11. As a new article of manufacture, the synthetic resin formed by the reaction between a phenolic body and an oxidized hydrocarbon mixture formed by the vapor or gaseous phase reaction of hydrocarbon and oxygen containing vapors or gases, said derivatives containing bodies of different molecular weights having aldehyde properties.

12. A resinous body prepared from reactive oxygenated petroleum resin and phenol.

13. The resinification process which comprises subjecting reactive oxygenated petroleum resin to the action of phenol.

14. The resinification process which comprises subjecting reactive oxygenated petroleum resin to the action of phenol in the presence of a catalyst.

15. The resinification process which comprises subjecting reactive oxygenated petroleum resin to the action of phenol in the presence of an acid catalyst.

16. As a new article of manufacture, the resinous product resulting from a reaction between reactive oxygenated petroleum resin and phenol.

17. As a new article of manufacture, the resinous product resulting from a reaction between reactive oxygenated petroleum resin and a reactive phenol.

JOSEPH HIDY JAMES.